United States Patent
Nichols et al.

(10) Patent No.: US 10,678,809 B2
(45) Date of Patent: Jun. 9, 2020

(54) SYNCHRONIZING NON-FILE CONTENT STORED ON A COLLABORATIVE WORKSPACE ENVIRONMENT

(71) Applicant: Microsoft Technology Licensing, LLC, Redmond, WA (US)

(72) Inventors: Jack Allen Nichols, Bothell, WA (US); Jason Fergus Moore, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 285 days.

(21) Appl. No.: 15/700,873

(22) Filed: Sep. 11, 2017

(65) Prior Publication Data
US 2019/0079986 A1 Mar. 14, 2019

(51) Int. Cl.
| | | |
|---|---|---|
| G06F 16/00 | (2019.01) | |
| G06F 16/27 | (2019.01) | |
| G06F 16/176 | (2019.01) | |
| G06F 16/178 | (2019.01) | |
| G06F 16/23 | (2019.01) | |
| G06F 16/25 | (2019.01) | |
| G06Q 10/10 | (2012.01) | |
| H04L 29/08 | (2006.01) | |

(52) U.S. Cl.
CPC ............ *G06F 16/27* (2019.01); *G06F 16/176* (2019.01); *G06F 16/178* (2019.01); *G06F 16/2379* (2019.01); *G06F 16/258* (2019.01); *G06Q 10/103* (2013.01); *H04L 67/1095* (2013.01)

(58) Field of Classification Search
CPC .. G06F 16/178; G06F 16/183; G06F 16/1748; G06F 11/1451; G06F 16/182; G06F 16/1873
See application file for complete search history.

(56) References Cited

U.S. PATENT DOCUMENTS

| | | | |
|---|---|---|---|
| 7,743,022 B2 | 6/2010 | Kaasten et al. | |
| 9,489,366 B2 | 11/2016 | Scott et al. | |
| 9,633,125 B1 | 4/2017 | Garcia et al. | |
| 9,672,261 B2 | 6/2017 | Holmes-Higgin et al. | |
| 2004/0205616 A1* | 10/2004 | Rosenberg | G06F 17/2264 715/205 |
| 2005/0091670 A1* | 4/2005 | Karatal | G06F 9/451 719/328 |

(Continued)

OTHER PUBLICATIONS

"How to: Synchronize items by using EWS in Exchange", Retrieved From <<https://msdn.microsoft.com/en-us/library/office/dn440953(v=exchg.150).aspx>>, Mar. 9, 2015, 6 Pages.

(Continued)

*Primary Examiner* — Truong V Vo

(57) ABSTRACT

This disclosure generally relates to synchronizing non-file content items from a collaborative workspace environment to a local computing device. Once the non-file content item has been synchronized to the local computing device, content or other data contained within the non-file content item may be accessed and edited. Once the edits are complete, the updated non-file content item may be provided back to the collaborative workspace environment. The changes may then be provided back to the original non-file content item such that it includes the most recent updates.

20 Claims, 11 Drawing Sheets

(56) References Cited

U.S. PATENT DOCUMENTS

| | | |
|---|---|---|
| 2010/0005157 A1 | 1/2010 | Mendez et al. |
| 2016/0065672 A1 | 3/2016 | Savage et al. |
| 2016/0147622 A1 | 5/2016 | Nichols et al. |
| 2016/0291856 A1 | 10/2016 | von muhlen et al. |
| 2017/0228359 A1 | 8/2017 | Cuzzort |
| 2017/0230466 A1 | 8/2017 | Carlos et al. |

OTHER PUBLICATIONS

"Marking Folders for Sync", Retrieved From <<https://community.box.com/t5/How-to-Guides-for-Sync/Marking-Folders-for-Sync/ta-p/699 >>, Mar. 27, 2015, 2 Pages.

"Synchronize a SharePoint list with a spreadsheet program", Retrieved From <<https://support.office.com/en-us/article/Synchronize-a-SharePoint-list-with-a-spreadsheet-program-d4337a01-2be4-43b5-bb42-28aefe64eafd>>, Retrieved Date: Jul. 14, 2017, 5 Pages.

"Syncing to a Spreadsheet From an External Source", Retrieved From <<https://success.workiva.com/help/spreadsheets/syncing-to-a-spreadsheet-from-an-external-source>> Retrieved Date: Jul. 14, 2017, 5 Pages.

"International Search Report and Written Opinion Issued in PCT Application No. PCT/US2018/037969", dated Sep. 20, 2018, 11 Pages.

\* cited by examiner

SYNCHRONIZING NON-FILE CONTENT STORED ON A COLLABORATIVE WORKSPACE ENVIRONMENT

BACKGROUND

Collaborative workspace environments typically enable individuals to share content with other individuals that access the collaborative workspace environment. This content typically includes documents, spreadsheets, forms, workflows lists and so on. Some of this content, such as word processing documents, may be synchronized to a local computing device. Once on the local device, the content may be edited and subsequently provided back to the collaborative workspace environment. The original content that is stored on the collaborative workspace environment may then be synchronized with the updated content to ensure that any changes that were made to the updated content are reflected in the original content.

However, other content, such as lists, workflows and forms that are also available or otherwise provided on the collaborative workspace environment, may not be synchronized in the same manner. As such, an individual that accesses the collaborative workspace environment may not be able to edit this type content offline or on a local computing device.

It is with respect to these and other general considerations that examples have been described. Also, although relatively specific problems have been discussed, it should be understood that the examples should not be limited to solving the specific problems identified in the background.

SUMMARY

This disclosure generally relates to synchronizing non-file content items from a collaborative workspace environment to a local computing device. Once the non-file content items have been synchronized to the local computing device, content or other data contained within the non-file content items may be edited. Once the edits are complete, the updated non-file content items may be provided back to the collaborative workspace environment. The updated non-file content items may then be synchronized with the original non-file content items such that the original non-file content items include the most recent updates.

However, the non-file content items may be stored on the collaborative workspace environment in a format that makes it difficult to synchronize the non-file content items to the local computing device and allow for an individual to access and edit the non-file content items. For example, if a non-file content item is synchronized to the local device in the format it has when stored on the collaborative workspace environment, editing of the non-file content item may be restricted to a particular content viewer and/or editor utilized by the application that downloaded the non-file content item.

Accordingly, described herein is a method and system for synchronizing non-file content items from a collaborative workspace environment to a local computing device and from the local computing device back to the collaborative workspace environment. As will be described, non-file content items may be synchronized in such a way that individuals may access and edit the non-file content items in the file system of the local computing device without requiring the use of a particular content viewer and/or editor.

As such, the present application describes a method for updating non-file content items. The method includes receiving a request for a non-file content item that is included in a collection of non-file content items. In some cases, the non-file content item includes content arranged in various rows and columns. The non-file content item is identified from the collection of non-file content items using an identifier contained in the request. Once identified, a non-file content package is generated by converting the content in the non-file content item from a first format to a second format. The non-file content package is then provided to a computing device that issued the request.

Also described is a method for synchronizing non-file content between a collaborative workspace environment and a local computing device. This method includes detecting that a non-file content stored on a remote computing device has been updated and generating a request for the non-file content. In response to the request, the non-file content is received by a local computing device from the collaborative workspace environment. However, the non-file content is received in a format that is different from the original format of the non-file content. The non-file content may be stored on the local computing device in a directory that is protected by one or more permissions that specify operations that may not be performed on the directory and operations that may not be performed on the non-file content. Changes to content contained in the non-file content may be received and the non-file content, with the changed content, may be provided back to the remote computing device.

The present disclosure also describes a system for synchronizing non-file content. The system includes at least one processor and a memory coupled to the at least one processor and storing instructions that, when executed by the at least one processor, perform a method. This method may include storing non-file content items in a collection of non-file content items in the memory. An update to at least one non-file content item that is included in the collection of non-file content items may be received. In some cases, the update to the non-file content item is in a first format. However, the non-file content items in the collection of non-file content items may be stored in a second format that is different than the first format. The instructions enable the identification of content in the at least one non-file content item that is different than content in the corresponding non-file content item in the collection of non-file content items. The first format of the content in the updated non-file content item may be altered so it conforms to the second format. The corresponding non-file content item in the collection of non-file content items may be subsequently updated using the content.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
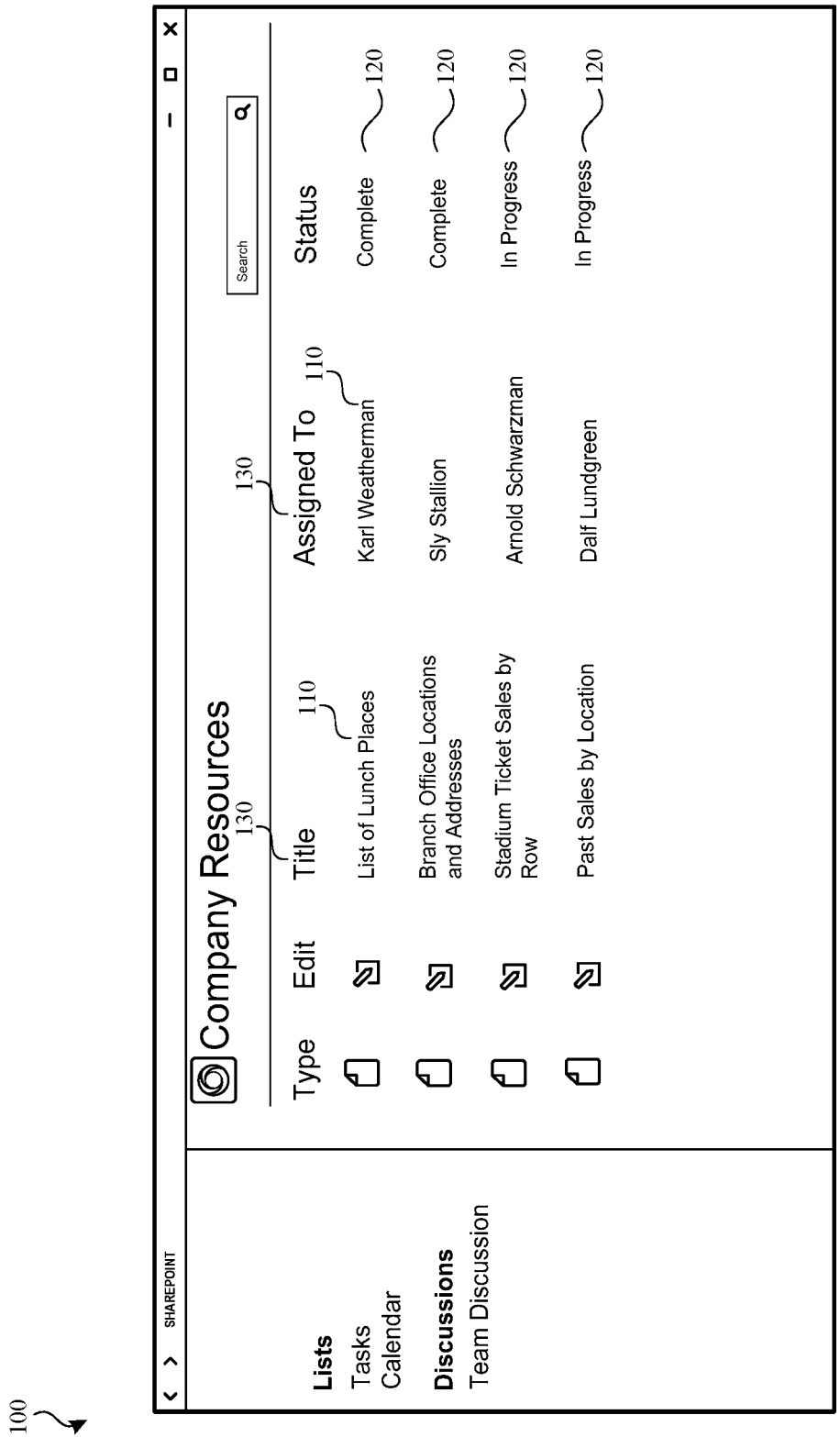
FIG. 1 illustrates an example of a non-file content item.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Historically, synchronization clients on local computing devices only synchronize files from a remote computing device, a server, a collaborative workspace environment and the like. As used herein, the term "file" means a single resource or object that stores data, information, settings or commands that may be opened, accessed or used by a particular application that executes on a local computing device and/or on a collaborative workspace environment.

However, collaborative workspace environments may host a variety of other content referred to herein as "non-file content items" or a "non-file content item." In current collaborative workspace environments, local computing devices are not able to easily synchronize these non-file contents. For example, due to the format of the non-file content items, the local computing device may have to have or execute a particular content application or viewer to access any downloaded non-file content item.

As used herein, the term "non-file content item(s)" means a collection of individual resources or objects, each of which store data and other content, metadata corresponding to the data and other content, and/or pointers to one or more files. Thus, each non-file content item may include multiple files, but each file is stored individually. In some examples, a non-file content item may be a list, a form, a workflow and the like.

A list in a collaborative workspace environment may operate like a set of tables in a database. In some cases, each list contains one or more items arranged in one or more rows, with each item in the row sharing a common schema (represented by the columns). Each item in the list can be manipulated by editing or removing it. Further, each list can have a different schema and different content.

In addition, a list can have other operations associated with it. For instance, a list, or items within a list, can have versions, compliance, governance settings, workflows, and other items attached to them that add value beyond just the data in the list.

A workflow is a pre-programmed mini-application that may be used to streamline and/or automate a variety of processes. As discussed above, a workflow may be associated with or otherwise incorporated within a list. In some instances, a workflow may be represented as a graphical map or flow chart that indicates or provides instructions that are to occur at each step. Each of these steps may include instructions for collecting signatures, collecting or providing feedback, collecting or providing document approvals and so on.

Accordingly, described herein are systems and methods that allow non-file content items, such as lists, workflows, forms and the like to be synchronized between a collaborative workspace environment and a local computing device. In some cases, the local computing device includes a synchronization client that is able to represent a set of non-file content items locally on a disk.

As will be explained in detail below, non-file content items stored or hosted by a collaborative workspace environment may be synchronized to a special folder on the local computing device. In some cases, each non-file content item, or content within the non-file content item, is converted from a first format (e.g., a file format native to the collaborative workspace environment) to a second format (e.g., a spreadsheet document format) prior to being provided to the local computing device. For example, the non-file content item may synchronized to a file format that is viewable and editable by a particular application that executes on the local computing device. In one non-limiting example, the non-file content item may be synchronized to a format that is utilized by a spreadsheet application.

Once the non-file content item has been synchronized to this format, an individual can manipulate the contents of the spreadsheet document to view and modify the contents of the non-file content item. In some instances, various cells of the spreadsheet document are protected such that the individual cannot intentionally or inadvertently change, alter or destroy the schema. The special folder may also be restrained via a filter driver that prevents the individual from creating a state of the non-file content item that cannot be synchronized with the original non-file content item stored on the collaborative workspace environment.

FIG. 1 illustrates an example of a non-file content item 100. In some examples, the non-file content item 100 may be stored on or provided by a collaborative workspace environment. As such, any individual that has access to the collaborative workspace environment may add items to the non-file content item 100, remove items from the non-file content item 100, access content associated with the non-file content item 100 and so on.

In some instances, the non-file content item 100 may be associated with a particular scope or group within the collaborative workspace environment. For example, an individual may have a first set of non-file content items 100 on a personal site within the collaborative workspace environment and have a second set of non-file content items 100 on a team site within the collaborative workspace environment. However, regardless of the number of non-file content items 100 hosted by the collaborative workspace environment, and regardless of the scope of the non-file content items 100, each non-file content item 100 that the individual has access to on the collaborative workspace environment may be downloaded to and/or synchronized with a local computing device.

In the example shown, the non-file content item 100 is a list. As described above, a list may operate like a set of tables in a database. In some cases, each list contains one or more items 110 arranged in one or more rows 120. In the example shown in FIG. 1, the items include documents titled "List of Lunch Places", "Branch Office Locations and Addresses", "Stadium Ticket Sales by Row", and "Past Sales by Location". Further, each item 110 in the row 120 shares a common schema (represented as columns 130). For example, each of the documents in each row have a "Type" schema, an "Edit" schema, a "Title" schema, an "Assigned To" and a "Status" schema. Although the list is shown with various schemas and items, this is for example purposes only.

The non-file content item 100 may be provided on the collaborative workspace environment in a particular format. For example, because the non-file content item 100 may include a number of different individual documents, each with its own respective content, the non-file content item may be akin to a container or database. However, in order to ensure that all of the content items and the other information included in the non-file content item may be synchronized to a local computing device, the non-file content item may need to be converted to a second format that is different than the first format. As will be explained in detail below, the second format is a format that enables the non-file content item 100 to be viewed and edited in a universal application, such as, for example, a spreadsheet application.

Figure 2A:
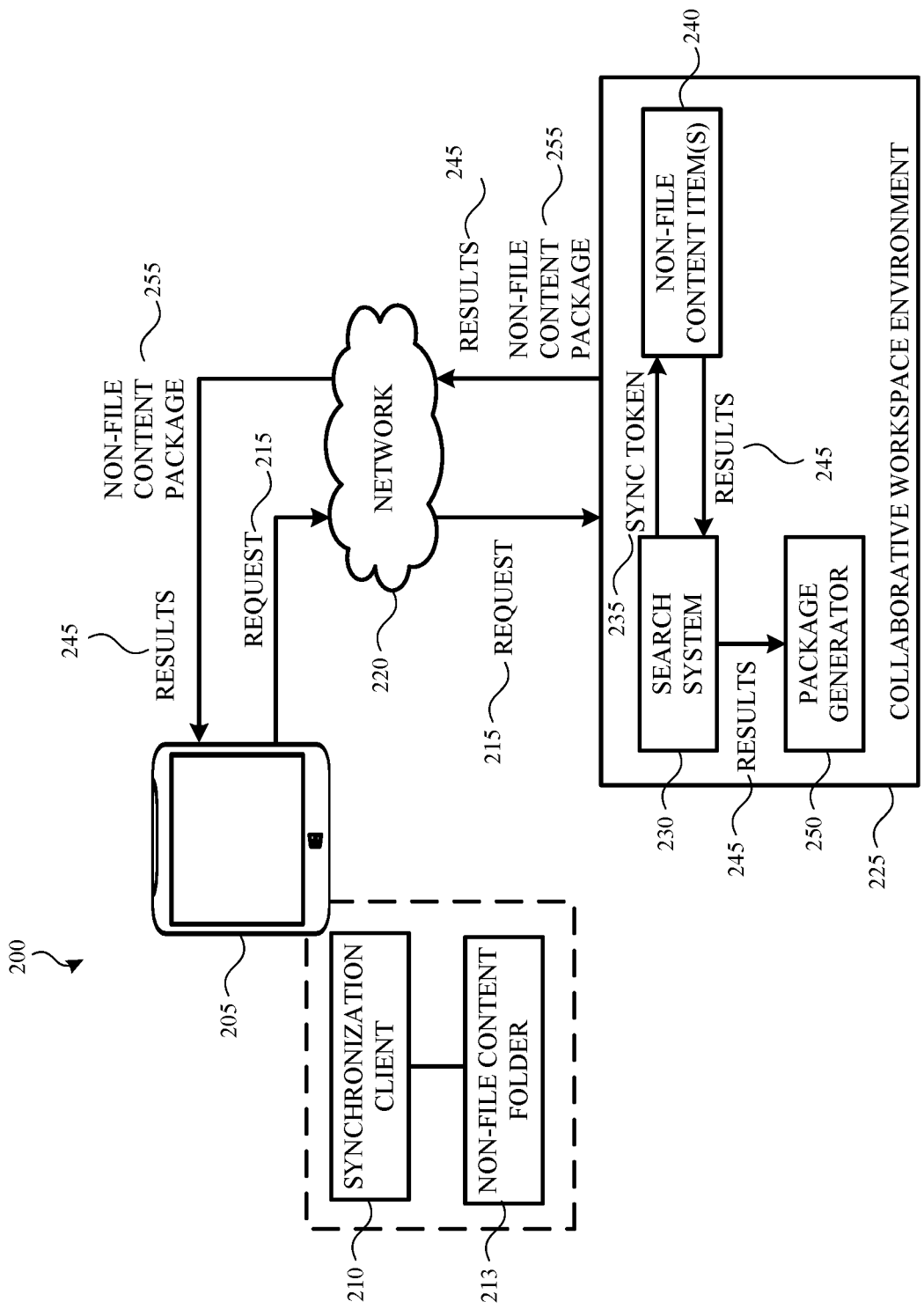
FIG. 2A illustrates a system for synchronizing non-file content items between a local computing device and a collaborative workspace environment according to an example.

FIG. 2A illustrates a system 200 for synchronizing non-file content items between a local computing device 205 and a collaborative workspace environment 225 according to an example.

The local computing device 205 may be any type of computing device capable of accessing the collaborative workspace environment 225 through a network 220 or other communication medium. Non-limiting examples of a local computing device 205 include, but are not limited to, a laptop computer, a desktop computer, a mobile phone, a tablet computing device, a handheld computing device, a wearable computing device, a video gaming machine and the like.

As shown in FIG. 2A, the local computing device 205 may include a synchronization client 210. The synchronization client 210 is configured to issue one or more requests 215 for non-file content items stored or otherwise hosted by the collaborative workspace environment 225. In some instances, the request 215 may be issued by the synchronization client 210 to determine what non-file content items (if any) are stored on the collaborative workspace environment 225. In other cases, the request 215 issued by the synchronization client 210 may be used to determine which non-file content items have been updated on the collaborative workspace environment 225 since the last synchronization process occurred.

The synchronization client 210 may operate on a scope-by-scope basis. For example and as described above, each non-file content item hosted by the collaborative workspace environment 225 may be associated with a particular site (e.g., a personal site, a team site and so on). As such, the synchronization client 210 may issue various queries or requests 215 on a per-scope basis. For example, one query or request 215 for non-file content items associated with a personal site may return only non-file content items associated with the individual's personal site on the collaborative workspace environment 225. Likewise, a different request 215 for non-file content items associated with one or more team sites (e.g., sites for which the individual is a member of a team) may return only non-file content items associated with a particular team site on the collaborative workspace environment 225.

When the synchronization client 210 issues a request 215, it is received by a search system 230 contained in or otherwise associated with the collaborative workspace environment 225. The request 215 causes the search system 230 to issue a particular method or function call that causes the collaborative workspace environment 225 to enumerate, return and/or list all of the changes that have occurred to each non-file content item in a collection of non-content file items 240 since the last synchronization process or since a certain point in time. In some cases, the collection of non-content file items 240 is stored in a database or other such storage device.

The search system 230 may provide a synchronization token 235 to the collection of non-file content items 240. The synchronization token 235 may represent a time that the last request 215 was received from this particular synchronization client 210 and thus indicates when the last synchronization process occurred. In some cases, the synchronization token 235 may be empty which indicates that a synchronization process has yet to occur. Thus, any non-file content items in the collection of non-file content items 240 should be provided to the local computing device 205.

Once the search system 230 has issued the search request and the associated synchronization token 235 to the collection of non-file content items 240, the search system 230 may identify one or more results 245. The results include a list of changes to the content contained in each non-file content item in the collection of non-file content items 240. In some cases, the results 245 may be listed in a prescribed format.

For example, if the non-file content item is a list, the results 245 may appear as a change in a payload of the search command issued by the search system 230. As such, the search command, and the corresponding results 245, support initial discovery of the list (or other such non-file content item hosted by the collaborative workspace environment 225). Additionally, the search command and the corresponding results 245 may be used to notify the synchronization client 210 of the changes to the non-file content item that have occurred since the last request 215 was issued.

In some cases, changes to the content within the non-file content item may be indicated by a format of the payload. For example, each non-file content item may be associated with an identifier (e.g., an etag or other such identifier) that is incremented each time the non-file content item is updated. The synchronization client 210 can compare the identifier within the payload of the search request issued by the search system 230 to the last known identifier associated with a particular non-file content item to determine whether the non-file content item has changed.

Although a specific process has been mentioned, other means of discovery may also be used. For example, the search system may provide a dedicated non-file content item discovery application programming interface that returns a list of all non-file content items that are stored or hosted by the collaborative workspace environment 225 or that have changed since the last request 215 was received.

When the synchronization client 210 discovers that changes have been made to one or more non-file content items, the synchronization client 210 may create a non-file content folder 213 (if one has not already been created due to a previously issued synchronization request).

In some examples, the synchronization client 210 creates a directory (referred to as (a non-file content folder 213) for each scope that contains at least one non-file content item. Additionally, each directory or non-file content folder 213 has certain properties or permissions that specify various operations that may and/or may not be performed on non-file-content folder 213 and/or on content within the non-file content folder 213.

For example, the non-file content folder 213 may indicate that only non-file content items may be stored within this particular non-file content folder 213, other files may not be added or removed from this non-file content folder 213, the non-file content folder 213 cannot be moved, renamed, or deleted, an individual that accesses or uses the local computing device 205 cannot rename, move, or delete any file within this non-file content folder 213. However, the permissions may also indicate that the individual can edit files or other content contained within the non-file content folder 213.

The above-identified set of permissions/restrictions may be enforced by a file system of the local computing device 205 and/or a file system access control list. For example, the file system may utilize a filter that intercepts all operations on the files in the non-file content folder 213. The filter may allow or deny the operations based on an identity of the caller that issued the operations. For example, if the caller is the synchronization client 210, the filter may allow the synchronization client 210 to perform any operation. However, if the caller is another application, user, or an administrator, the operations may be blocked.

In another implementation, all operations issued on the non-file content folder may be allowed. However, the synchronization client 210 may be authorized to reverse some or all of the changes if the one or more of the changes are determined to interfere with a subsequent synchronization process (e.g., a synchronization process that uploads local changes to the collaborative workspace environment 225).

Once the non-file content folder 213 has been created and the synchronization client 210 has determined that one or more non-file content items have been updated on the collaborative workspace environment 225, the synchronization client 210 may issue another request 215 that indicates that the identified non-file content items are to be downloaded to the local computing device 205.

When the download request 215 is received, the search system 230 may pass the results 245 to a package generator 250. The package generator 250 takes each individual item within the non-file content item and constructs a non-file content package 255. In some cases, the non-file content package has a format that differs from a format of the non-file content items in the collection of non-file content items 240. For example, the package generator 250 may construct a spreadsheet application file from the contents or items in the non-file content item.

In order to generate the non-file content package 255, the search system 230, and/or the package generator 250, may generate a persistent resource identifier for each identified non-file content item. The persistent resource identifier may also be used in each payload of the search command that was issued by the search system 230.

In other implementation, the non-file content package 255 may include or otherwise be associated with a resource identifier. In such cases, the non-file content package 255 may be included in the payload of the search command.

Thus, when the synchronization client 210 issues a request for a particular resource identifier, the search system 230 can query the collection of non-file content item(s) to identify only those that have changed. The results 245 may be sent to the package generator 250 which generates the non-file content package 255 such as previously described. In other cases, the synchronization client 210 may request that the entire non-file content item be returned regardless of the changes that were made or otherwise identified.

In some cases, the package generator 250 may generate the non-file content package 255 such that one or more fields within the resulting spreadsheet document are protected. For example, the package generator 250 may cause one or more cells of the spreadsheet to be protected, one or more macros to be protected and the like.

The package generator 250 may also cache the generated non-file content package 255. Thus, when a download is subsequently requested, the search system 230 may compare a time at which a particular non-file content package 255 was generated with the last known detected change of the associated non-file content item. If the non-file content item has changed, the information may be used to regenerate the non-file content package 255. In other cases, any changes between the non-file content item and the non-file content package 255 may be traced in a document, a graph or the like that allows and/or tracks co-authoring and collaboration between individuals.

Once the non-file content package 255 has been created, it is transmitted to the local computing device 205. The synchronization client 210 analyzes the content in the non-file content package and stores the content in an associated non-file content folder 213.

Once the content within the non-file content package 255 has been stored in its respective folder, an individual may use the local computing device 205 to interact with the content using an application resident on the local computing device 205, such as, for example a spreadsheet application. The content within the spreadsheet document may be added to, edited, deleted or reordered. For example, the permissions associated with the content in the spreadsheet document and/or the spreadsheet application may enable an individual to use the local computing device 205 to edit an item in the spreadsheet document, add a new item to the spreadsheet document, delete an item in the spreadsheet document or reorder items in the spreadsheet document.

In some cases, the permissions may also restrict what operations may be performed on content within the spreadsheet. For example, the individual may be prohibited from changing a schema associated with the spreadsheet. Additionally, the individual may be prohibited from adding additional content to the spreadsheet document that is outside of the content specified by the spreadsheet document.

Figure 2B:
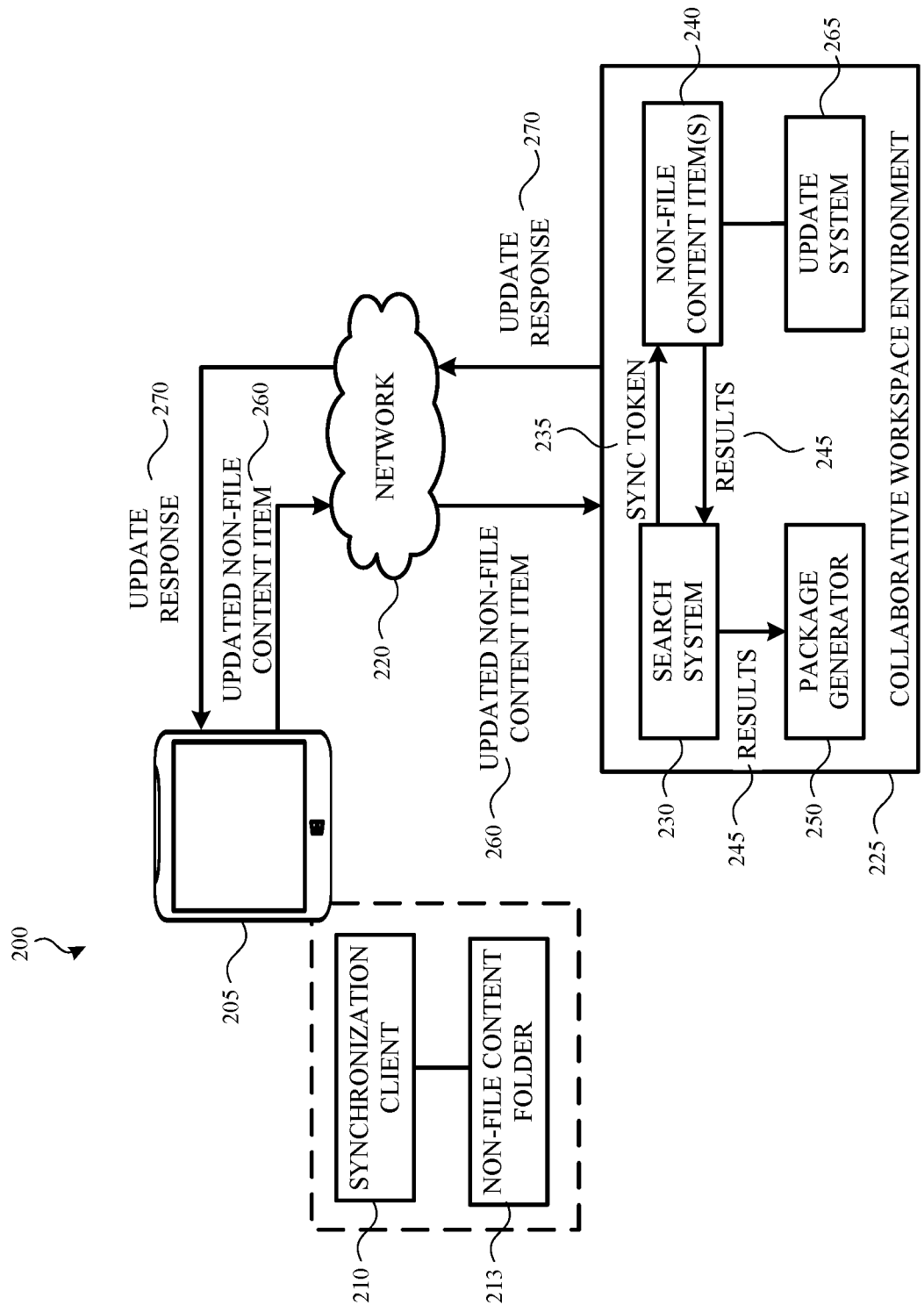
FIG. 2B illustrates the system of FIG. 2A in which a non-file content item stored on a local computing device is provided back to a collaborative workspace environment according to an example.

FIG. 2B illustrates the system 200 of FIG. 2A in which a non-file content item stored on a local computing device 205 is provided back to the collaborative workspace environment 225 according to an example.

Once an individual uses the local computing device 205 to update a non-file content item, the synchronization client 210 may be configured to detect that one or more content items within the non-file content item, or the non-file content item itself, has changed. For example, the synchronization client 210 may detect that the non-file content item has a new timestamp, a new hash, a new size and so on. Once this is detected, the synchronization client 210 may issue a change request (e.g., to its associated state machine) or provide some other indication that the non-file content item has changed.

The synchronization client 210 may then provide the updated non-file content item 260 (in the second format, such as, for example, in the spreadsheet document format) back to the collaborative workspace environment 225. An update system 265 that is associated with the collaborative workspace environment 225 receives the updated non-file content item 260 and determines which items within the updated non-file content item 260 have been changed. The update system 265 may also identify the associated non-file content item (e.g., the "original" non-file content item) in the collection of non-file content items 240.

In some cases, and as described above, only the items that have changed within the updated non-file content item 260 include a specific resource identifier. In other implementations, the entire updated non-file content item 260 may include a single resource identifier. In yet other implementations, each of the updated items may be associated with a specific resource identifier and the entire updated non-file content item 260 may also include or otherwise be associated with another resource identifier.

Once the original non-file content item has been identified, the update system 265 may break down each content item within the updated non-file content item into individual items and/or may break down each content item within the original non-file content item into individual items. Each of these individual items (or only those items that have been updated) in the updated non-file content item may be synchronized with its associated original non-file content item. For example, the update system 265 may create, delete or update each item in the original non-file content item with corresponding updated items in the updated non-file content item 260.

Once this process has been completed, the update system 265 may send an update response 270 back to the local computing device 205. Once the update response 270 has been received, the synchronization engine 210 may update the non-file content folder 213 with an indication that the updated non-file content item 260 has been successfully synchronized with the collaborative workspace environment.

In some cases, the non-file content item that was stored in the collaborative workspace environment may differ from what was uploaded from the local computing device 205. In such cases, non-file content item stored on the collaborative workspace environment 225 is synchronized with the updated non-file content item and the update response 270 includes the newly synchronized non-file content item. This ensures that any additional changes made to the non-file content item (e.g., changes made by other individuals that access the collaborative workspace environment 225) are provided back to the local computing device 205.

For example, as many different individuals can access the collaborative workspace environment 225, it is possible that the upload of the updated non-file content item 260 can succeed, but the update response 270 may return different content from that which was uploaded. As such, the synchronization client 210 may need to issue another request to see if the non-file content item has changed. If so, the synchronization client may need to issue a subsequent download request for that non-file content item.

Additionally, it is possible that conflicts may occur as non-file content items are edited offline or on a local computing device 205 by different individuals. For example, two different individuals (A and B in the scenarios below) may edit the same non-file content item on two different local computing devices 205. The following are examples of how these conflicts may be resolved.

In the first example, individual A and individual B both add a new item to the same non-file content item. Individual A may upload his change first to the collaborative workspace environment 225. His upload is successful and the contents of the non-file content item on the collaborative workspace environment 225 match the non-file content in the non-file content folder 213 of his local computing device 205.

Individual B may then upload her changes to the non-file content item. In this scenario, the update system 265 accepts her upload because it is able to break down or shred her updated non-file content item 260 into individual parts. In this case, the updated system 265 determines that individual B added a new item and that that item can be added to the non-file content item that was just updated based on the changes made by individual A. However, individual B receives a different non-file content item in the update response 270 than what was uploaded. As such, individual B may be required to redownload the non-file content package 255 so individual B's local copy of the non-file content item includes the changes made by individual A.

In response to the changes made by individual B, individual A may receive a notification (e.g., an etag bump) the next time individual A's local computing device 205 issues a request 215 to the search system 230. For example, in response to the request 215, the search system 230 may indicate in a method call payload, that new content is available on the collaborative workspace environment. In response, the synchronization client 210 on individual A's local computing device 205 may request the updated content.

Although the above example was described for both individuals adding an item, this scenario applies to other changes includes deleting different items from the same non-file content item, deleting the same item from the same non-file content item and updating different items in the same non-file content item.

In another scenario, individual A and individual B may both edit the same item in the same non-file content item. In this scenario, individual A may upload his changes to the collaborative workspace environment before individual B uploads her changes. Individual A's upload is successful and non-file content item in the collaborative workspace environment matches the one in his non-file content folder 213. Individual B may then provide her update to the collaborative workspace environment 225.

In this scenario, the update system may determine that a conflict has arisen and fork the item by making a copy of it. Individual B then receives a newly updated non-file content item that contains both individual A's edits as well as individual B's edits. The synchronization client 210 on Individual A's local computing device 205 may receive a notification (e.g., an etag bump) as a result of a subsequently issued request 215 and determine that new content for this identified non-file content item is available on the collaborative workspace environment. The synchronization client 210 my then issue a download request such as described above.

In yet another scenario, individual A may edit a particular item in a non-file content item but individual B may delete it. In this case, the update system 265 may behave differently depending on which changes are uploaded first. If individual A's edits are received first, individual B's deletion operation is discarded. However, if individual B's edits are received first, individual A's edit is treated as an add. In either case, the end result is that the item is edited, but not deleted.

It is also possible for conflicts to occur on the local computing device 205. For instance, the synchronization client 210 may download a change from the collaborative workspace environment 225 that conflicts with a locally made change. In this case, the synchronization client 210 may automatically discard the download from the collaborative workspace environment 225 and upload the local change to the collaborative workspace environment 225. Once the change is received, the update system may shred and merge the changes such as described above and issue a new version of the non-file content item. The synchronization may then redownload the new version of the non-file content item.

Although the shred and merge operation are described as occurring on the collaborative workspace environment, this may also or alternatively occur on the local computing device 205.

In other scenarios the collaborative workspace environment 225 may support coauthoring of the non-file content item. To support coauthoring each individual may be required to have a coauthoring version of a spreadsheet application. Additionally, the item that is being coauthored may be associated with a document that includes information that allows the search system 230, or other component of the collaborative workspace environment 225, to create a change graph. The change graph may allow any detected changes to be merged, either offline or in real time. In some cases, the change graph is a structure that allows the spreadsheet application to track changes that are made to the document. Additionally, the change graph must be stable for the lifetime of the non-file content item. For instance, the update system 265 may be required to cache the graph and spreadsheet document associated with the non-file content item. The update system 265 may also be required to provide a waterline and cobalt hash for the document (e.g. "collaborative metadata").

Figure 3:
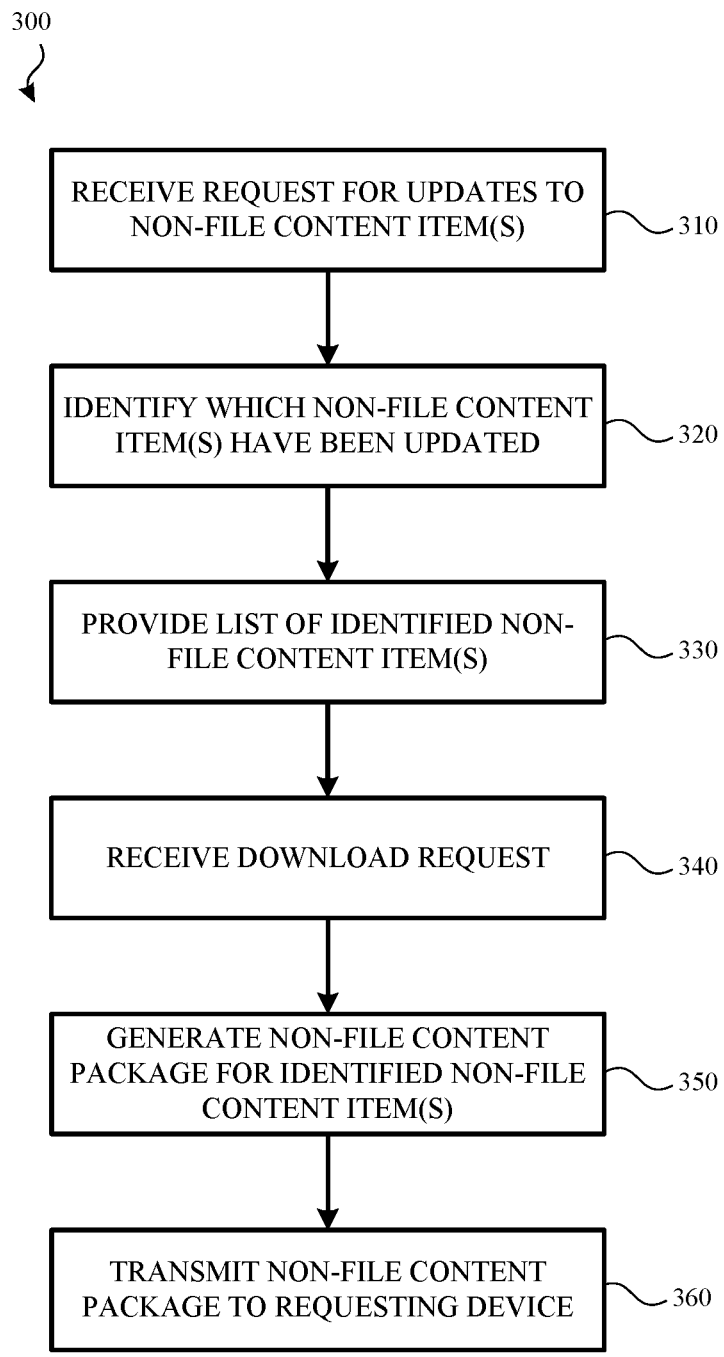
FIG. 3 illustrates a method for synchronizing a non-file content item in response to a request received from a local computing device according to an example.

FIG. 3 illustrates a method 300 for synchronizing a non-file content item in response to a request received from a local computing device according to an example. The method 300 may be used by a collaborative workspace environment such as described above with respect to FIG. 2A and FIG. 2B.

Method 300 begins at operation 310 in which a request for updates to one or more non-file content items are received by the collaborative workspace environment. In some cases, the request may be issued by a synchronization client executing on a local computing device and received by a search system that resides on the collaborative workspace environment.

Once the request is received by the search system, flow proceeds to operation 320 and the search system identifies which non-file content items (or which items in a particular non-file content item) have been updated. In some instances, the search system may issue a particular command that identifies that changes that have been made to the non-file content item. This information may then be returned in a payload of the issued command.

Flow then proceeds to operation 330 and a list of identified non-file content items that have changed (or a list of particular items of content within one or more non-file content items that have changed) since the last synchronization request is returned to the search system and/or the synchronization client on the local computing device.

Once this information is received, flow proceeds to operation 340 and the collaborative workspace environment may receive, from the synchronization client, a download request. As described above, the download request may be a request to download the content item or content items that have changed since the last synchronization request. In other examples, the download request may be a request to download only updated content for one or more identified non-file content items. For example, if an identified non-file content item was updated to add a new entry, only the new entry would be downloaded. In other cases, the entire non-file content item is downloaded regardless of the number of changes or updates made or identified.

Flow then proceeds to operation 350 and a non-file content package for the identified non-file content items is generated. In some instances, the non-file content item on the collaborative workspace environment is in a first format and this first format is not easily editable by an individual that accesses the local computing device. As such, a package generator associated with the collaborative workspace environment may alter the format of the non-file content item. In one example, the package generator converts the non-file content item to a spreadsheet document. The spreadsheet document may include all the individual content items that were included in the non-file content item.

Once the non-file content package has been generated, flow proceeds to operation 360 and the non-file content package is transmitted to the requesting device.

Figure 4:
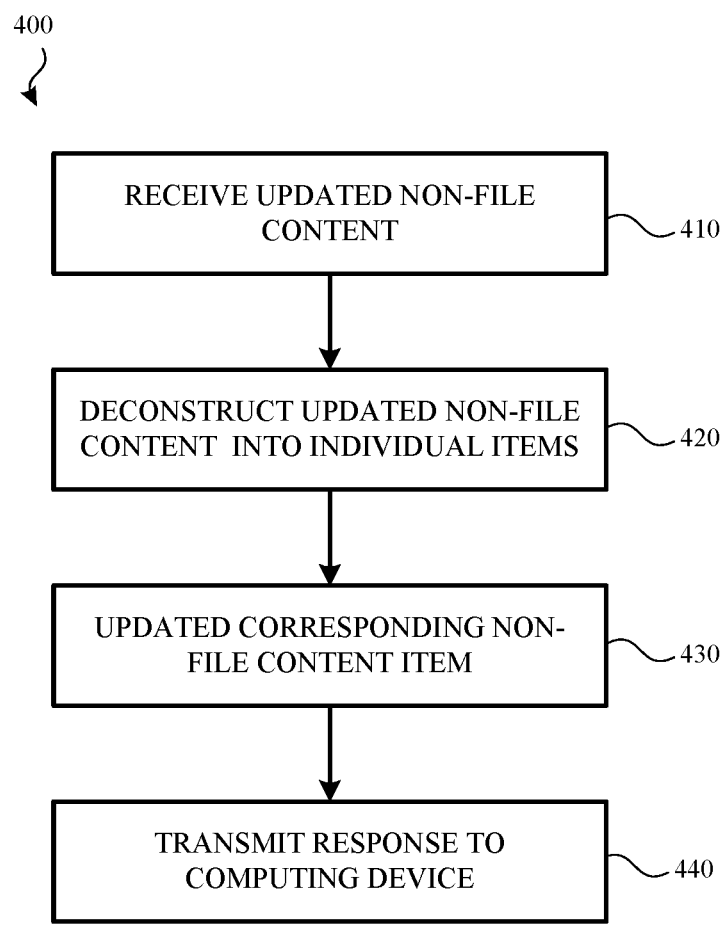
FIG. 4 illustrates a method for applying changes contained within an updated non-file content item to the original non-file content item stored on the collaborative workspace environment according to an example.

FIG. 4 illustrates a method 400 for applying changes contained within an updated non-file content item to the original non-file content item stored on the collaborative workspace environment according to an example. The method 400 may be performed by the collaborative workspace environment described above with respect to FIG. 2A and FIG. 2B.

Method 400 begins at operation 410 in which an updated non-file content is received by the collaborative workspace environment. In some cases, the updated non-file content may have been edited on a local computing device. The update that is received may include the entire non-file content item or only portions of the non-file content item that have been updated. The updated non-file content item may also be associated with an identifier that indicates which "original" non-file content item on the collaborative workspace environment the updated non-file content item is associated with.

Once the updated non-file content item is received by the collaborative workspace environment, flow proceeds to operation 420 and the collaborative workspace environment deconstructs the updated non-file content item into individual content items. In some instances, the deconstruction is performed by an update system associated with the collaborative workspace environment. The update system may also be configured to deconstruct the "original" non-file content item that is associated with the updated non-file content item into individual content items.

Flow then proceeds to operation 430 and the "original" non-file content item is updated with or synchronized with the updated non-file content item. In some cases, individual content items within the updated non-file content item are applied to corresponding content items in the "original" non-file content item.

In operation 440 and once the update has been completed, an update response is provided to the local computing device. In some cases, the update response may include a copy of the now updated non-file content item. In other cases, the response may simply indicate that the update was a success. In yet other cases, the response may indicate that additional changes have been made. For example, the response may indicate that another individual has provided edits to the non-file content item. As such, the non-file content item should be redownloaded by the local computing device such as previously described.

Figure 5:
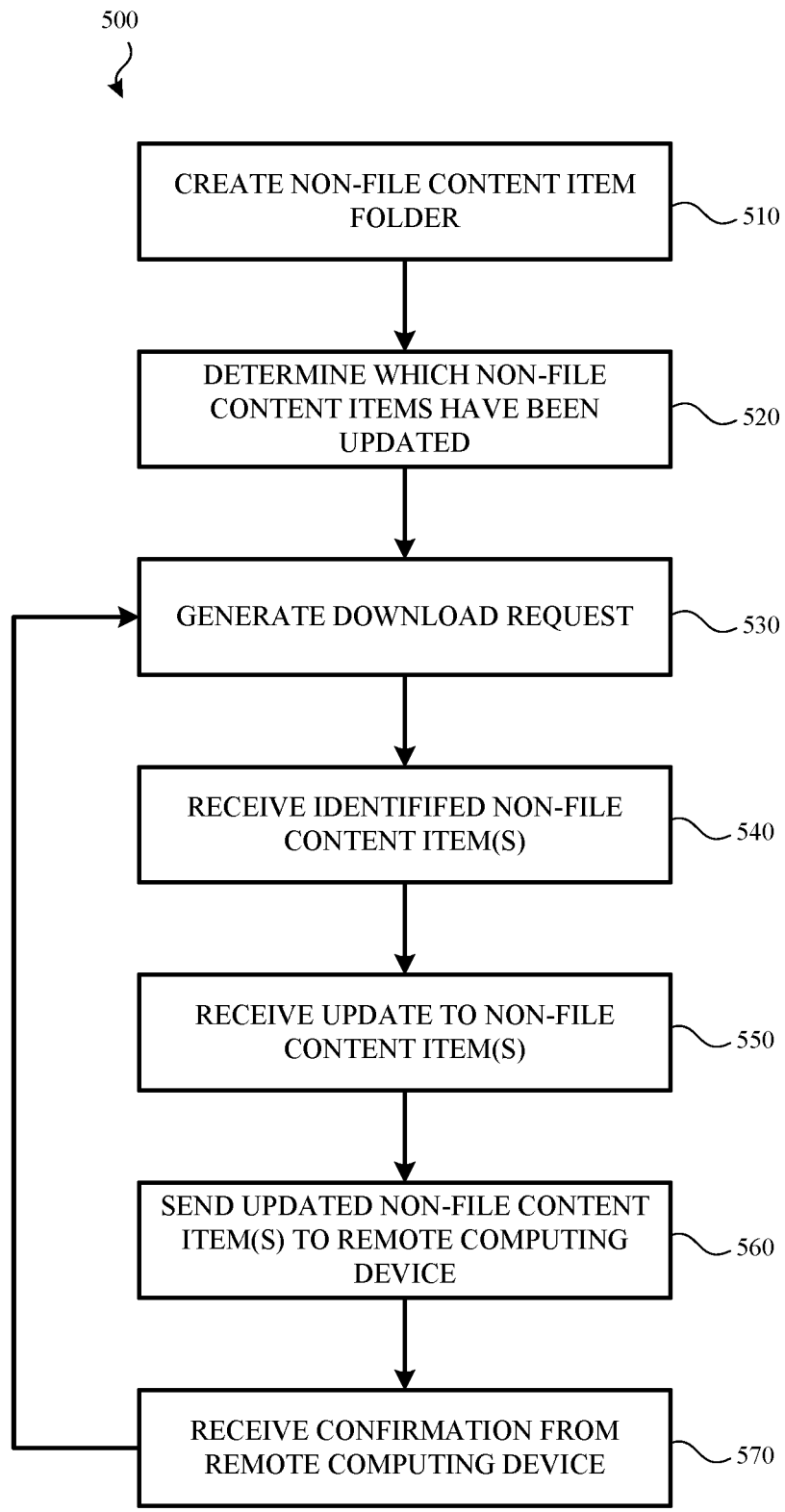
FIG. 5 illustrates a method for receiving and editing a non-file content item on a local computing device according to an example.

FIG. 5 illustrates a method 500 for receiving and editing a non-file content item on a local computing device according to an example. The method 500 may be performed by a local computing device such as described with respect to FIG. 2A and FIG. 2B. In some cases, the method 500 may be performed by a synchronization client that is associated with the local computing device.

Method 500 begins at operation 510 in which a synchronization client creates a non-file content item folder or directory. In some cases, this folder may be created in response to the synchronization client issuing a download request to the collaborative workspace environment. In other cases, this folder may be created in response to receiving a particular non-file content item. For example, if the synchronization client issues a download request for a particular non-file content item associated with a particular site (e.g., a team site) on the collaborative workspace environment, the folder may be created for that particular non-file content item and/or for one or more non-file content items associated with that particular team site.

Flow then proceeds to operation 520 and the synchronization client may be able to determine which non-file content items on the collaborative workspace environment have been updated. In some cases, this determination is made by the synchronization client issuing a request to the collaborative workspace environment. The request may be a general request to download one or more particular non-file content items or a general request that is automatically and/or periodically issued by the synchronization client. In yet other cases, the determination may be made based on an update response (e.g., update response 270) provided by the collaborative workspace environment.

Once the determination has been made, flow proceeds to operation 530 and the synchronization client may generate a download request. The download request may be a request to download an entire identified non-file content item, all non-file content items on a particular site, or only content for one or more identified non-file content items that have been updated since the last synchronization request.

Flow then proceeds to operation 540 and the identified non-file content items are received by the computing device. As described above, the identified non-file content items may be received in a format that is different from the format they are originally provided in on the collaborative workspace environment. For example, when the non-file content item is received by the local computing device, the content in the non-file content item may be provided in a spreadsheet document which enables an individual to easily access and edit the content in the non-file content item. Additionally, the non-file content item may be stored in a particular directory or folder that was created by the synchronization client. As described above, the folder may have certain properties or permissions that specify various operations that may and/or may not be performed on non-file-content folder and/or on content within the non-file content folder.

For example, the non-file content folder may indicate that only non-file content items may be stored within this particular non-file content folder, other files may not be added or removed from this non-file content folder, the non-file content folder cannot be moved, renamed, or deleted, an individual that uses the local computing device cannot rename, move, or delete any file within this non-file content folder. However, the permissions may also indicate that the individual can edit files or other content contained within the non-file content folder.

When the non-file content item is received, flow proceeds to operation 550 and one or more changes to the non-file content item may be received. In some cases, the operations performed on the content within the non-file content item (now represented as a spreadsheet document) may also be restricted. For example, an individual may be prohibited from changing a schema associated with the spreadsheet document. Additionally, the individual may be prohibited from adding additional content to the spreadsheet document that is outside of the content specified by the spreadsheet document.

Once the updates are complete, flow proceeds to operation 560 and the updated non-file content item is provided to the collaborative workspace environment. Once the upload has been successful, a confirmation is received 570 from the collaborative workspace environment.

In some cases, the confirmation may indicate that additional changes have been made to the recently uploaded non-file content item. For example, the confirmation may indicate that another individual has also edited the non-file content item. In such cases, flow may proceed back to operation 530 and the synchronization client may issue another download request for the identified non-file content item such that the version of the non-file content item stored locally matches the version that is stored on the collaborative workspace environment.

FIG. 6-FIG. 9 and their associated descriptions provide a discussion of a variety of operating environments in which aspects of the disclosure may be practiced. However, the devices and systems illustrated and discussed with respect to FIG. 6-FIG. 9 are for purposes of example and illustration and are not limiting of a vast number of computing device configurations that may be utilized for practicing aspects of the disclosure, as described herein.

Figure 6:
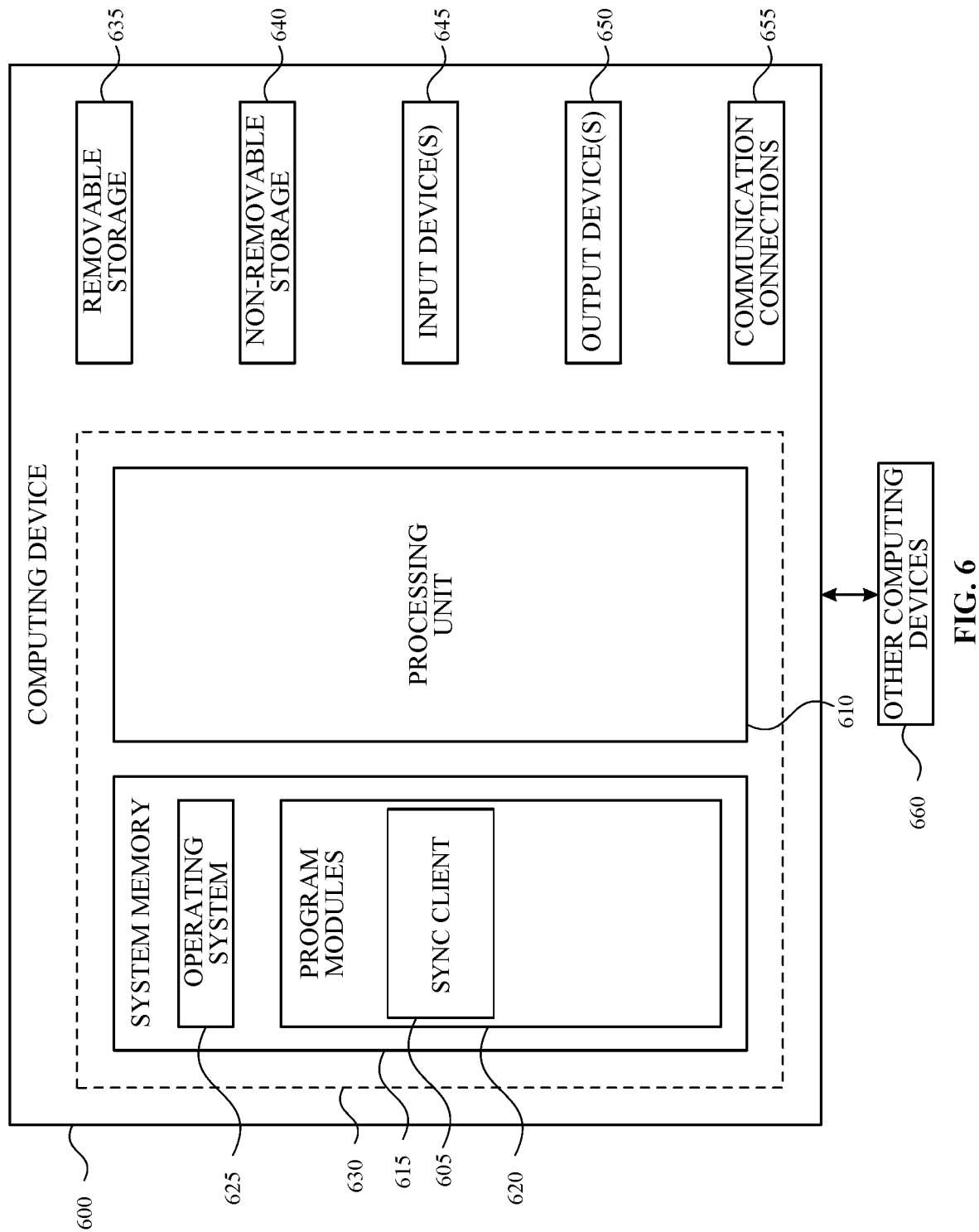
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device 600 may be similar to the local computing device 205 described above with respect to FIG. 2A. Additionally or alternatively, the computing device 600, or the various components described in conjunction with the computing device 600, may be used with, may be part of or may be integrated with the collaborative workspace environment 225. The components of the computing 600 described below may have computer executable instructions for synchronizing non-file content items such as described above.

In a basic configuration, the computing device 600 may include at least one processing unit 610 and a system memory 615. Depending on the configuration and type of computing device 600, the system memory 615 may comprise, but is not limited to, volatile storage (e.g., random access memory), non-volatile storage (e.g., read-only memory), flash memory, or any combination of such memories. The system memory 615 may include an operating system 625 and one or more program modules 620 or components suitable for identifying various objects contained within captured images such as described herein.

The operating system 625, for example, may be suitable for controlling the operation of the computing device 600. Furthermore, examples of the disclosure may be practiced in conjunction with a graphics library, other operating systems, or any other application program and is not limited to any particular application or system. This basic configuration is illustrated in FIG. 6 by those components within a dashed line 630.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 635 and a non-removable storage device 640.

As stated above, a number of program modules and data files may be stored in the system memory 615. While executing on the processing unit 610, the program modules 620 (e.g., a synchronization client 605) may perform processes including, but not limited to, the aspects, as described herein.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the computing device 600 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general purpose computer or in any other circuits or systems.

The computing device 600 may also have one or more input device(s) 645 such as a keyboard, a trackpad, a mouse, a pen, a sound or voice input device, a touch, force and/or swipe input device, etc. The output device(s) 650 such as a display, speakers, a printer, etc. may also be included. The aforementioned devices are examples and others may be used. The computing device 600 may include one or more communication connections 655 allowing communications with other computing devices 660. Examples of suitable communication connections 655 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 615, the removable storage device 635, and the non-removable storage device 640 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
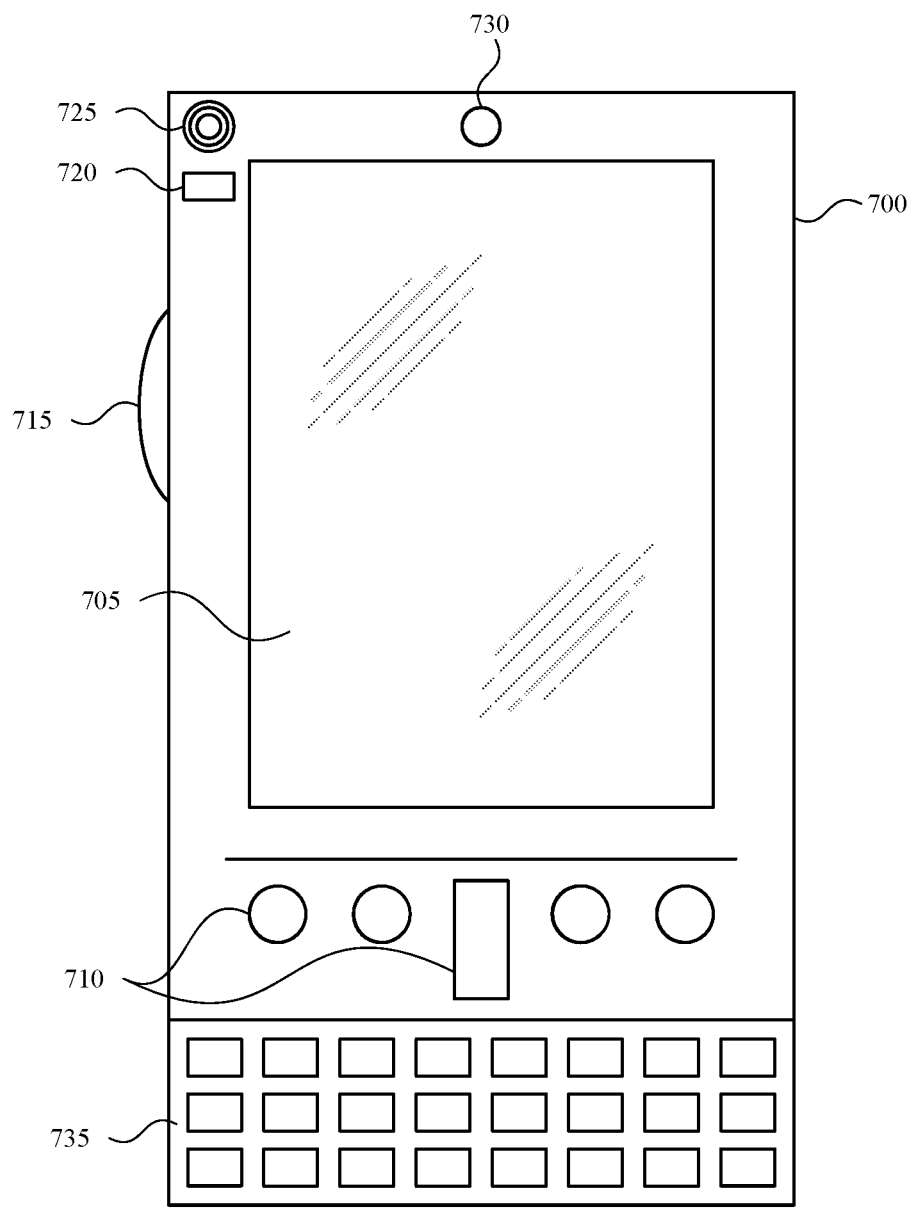
FIGS. 7A and 7B are simplified block diagrams of a mobile computing device with which aspects of the present disclosure may be practiced.
Figure 7B:
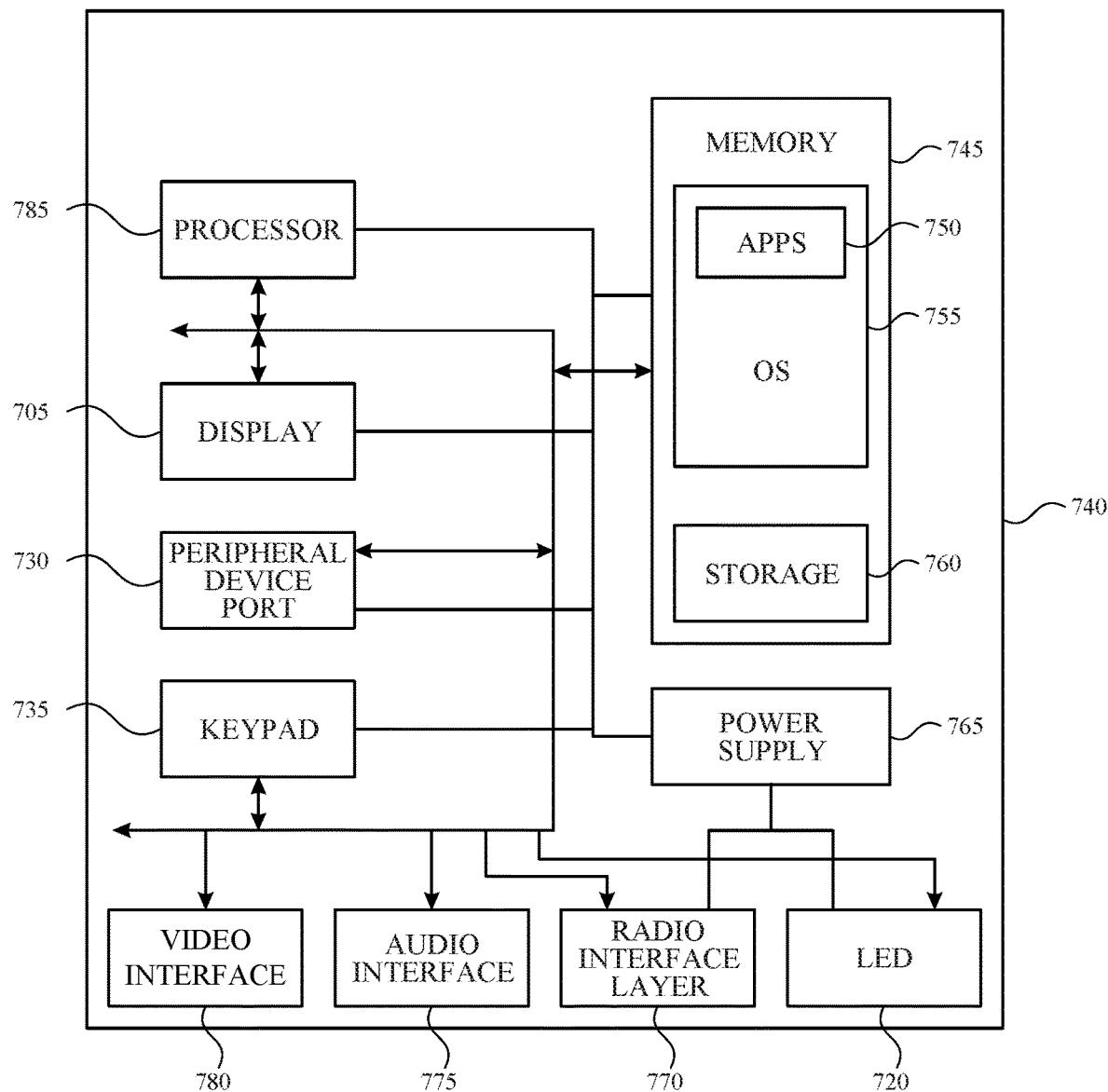

FIGS. 7A and 7B illustrate a mobile computing device 700, for example, a mobile telephone, a smart phone, wearable computer (such as a smart watch), a tablet computer, a laptop computer, and the like, with which examples of the disclosure may be practiced. With reference to FIG. 7A, one aspect of a mobile computing device 700 for implementing the aspects is illustrated.

In a basic configuration, the mobile computing device 700 is a handheld computer having both input elements and output elements. The mobile computing device 700 typically includes a display 705 and one or more input buttons 710 that allow an individual to enter information into the mobile computing device 700. The display 705 of the mobile computing device 700 may also function as an input device (e.g., a display that accepts touch and/or force input).

If included, an optional side input element 715 allows further input. The side input element 715 may be a rotary switch, a button, or any other type of manual input element. In alternative aspects, mobile computing device 700 may incorporate more or less input elements. For example, the display 705 may not be a touch screen in some examples. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various examples, the output elements include the display 705 for showing a graphical user interface (GUI) (such as the one described above that provides visual representation of a determined pronunciation and may receive feedback or other such input, a visual indicator 720 (e.g., a light emitting diode), and/or an audio transducer 725 (e.g., a speaker). In some aspects, the mobile computing device 700 incorporates a vibration transducer for providing an individual with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device 700. That is, the mobile computing device 700 can incorporate a system (e.g., an architecture) 740 to implement some aspects. In one embodiment, the system 740 is implemented as a "smart phone" capable of running one or more applications (e.g., browser, e-mail, calendaring, contact managers, messaging clients, games, media clients/players, content selection and sharing applications and so on). In some aspects, the system 740 is integrated as an electronic device, such as an integrated personal digital assistant (PDA) and wireless phone.

One or more application programs 750 may be loaded into the memory 745 and run on or in association with the operating system 755. Examples of the application programs include phone dialer programs, e-mail programs, personal information management (PIM) programs, word processing programs, spreadsheet programs, Internet browser programs, messaging programs, and so forth.

The system 740 also includes a non-volatile storage area 760 within the memory 745. The non-volatile storage area 760 may be used to store persistent information that should not be lost if the system 740 is powered down.

The application programs 750 may use and store information in the non-volatile storage area 760, such as email or other messages used by an email application, and the like. A synchronization application (not shown) also resides on the system 740 and is programmed to interact with a corresponding synchronization application resident on a host computer to keep the information stored in the non-volatile storage area 760 synchronized with corresponding information stored at the host computer.

The system 740 has a power supply 765, which may be implemented as one or more batteries. The power supply 765 may further include an external power source, such as an AC adapter or a powered docking cradle that supplements or recharges the batteries.

The system 740 may also include a radio interface layer 770 that performs the function of transmitting and receiving radio frequency communications. The radio interface layer 770 facilitates wireless connectivity between the system 740 and the "outside world," via a communications carrier or service provider. Transmissions to and from the radio interface layer 770 are conducted under control of the operating system 755. In other words, communications received by the radio interface layer 770 may be disseminated to the application programs 750 via the operating system 755, and vice versa.

The visual indicator 720 may be used to provide visual notifications, and/or an audio interface 775 may be used for producing audible notifications via an audio transducer (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 765 so that when activated, they remain on for a duration dictated by the notification mechanism even though the processor 785 and other components might shut down for conserving battery power. The LED may be programmed to remain on indefinitely until the individual takes action to indicate the powered-on status of the device.

The audio interface 775 is used to provide audible signals to and receive audible signals from the individual (e.g., voice input such as described above). For example, in addition to being coupled to the audio transducer 725, the audio interface 775 may also be coupled to a microphone to receive audible input, such as to facilitate a telephone conversation. In accordance with examples of the present disclosure, the microphone may also serve as an audio sensor to facilitate control of notifications, as will be described below.

The system 740 may further include a video interface 780 that enables an operation of peripheral device 730 (e.g., on-board camera) to record still images, video stream, and the like.

A mobile computing device 700 implementing the system 740 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 760.

Data/information generated or captured by the mobile computing device 700 and stored via the system 740 may be stored locally on the mobile computing device 700, as described above, or the data may be stored on any number of storage media that may be accessed by the device via the radio interface layer 770 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 770 or via a distributed computing network. Similarly, such data/information may be readily transferred between electronic devices for storage and use according to well-known data/information transfer and storage means, including electronic mail and collaborative data/information sharing systems.

As should be appreciated, FIG. 7A and FIG. 7B are described for purposes of illustrating the present methods and systems and is not intended to limit the disclosure to a particular sequence of steps or a particular combination of hardware or software components.

Figure 8:
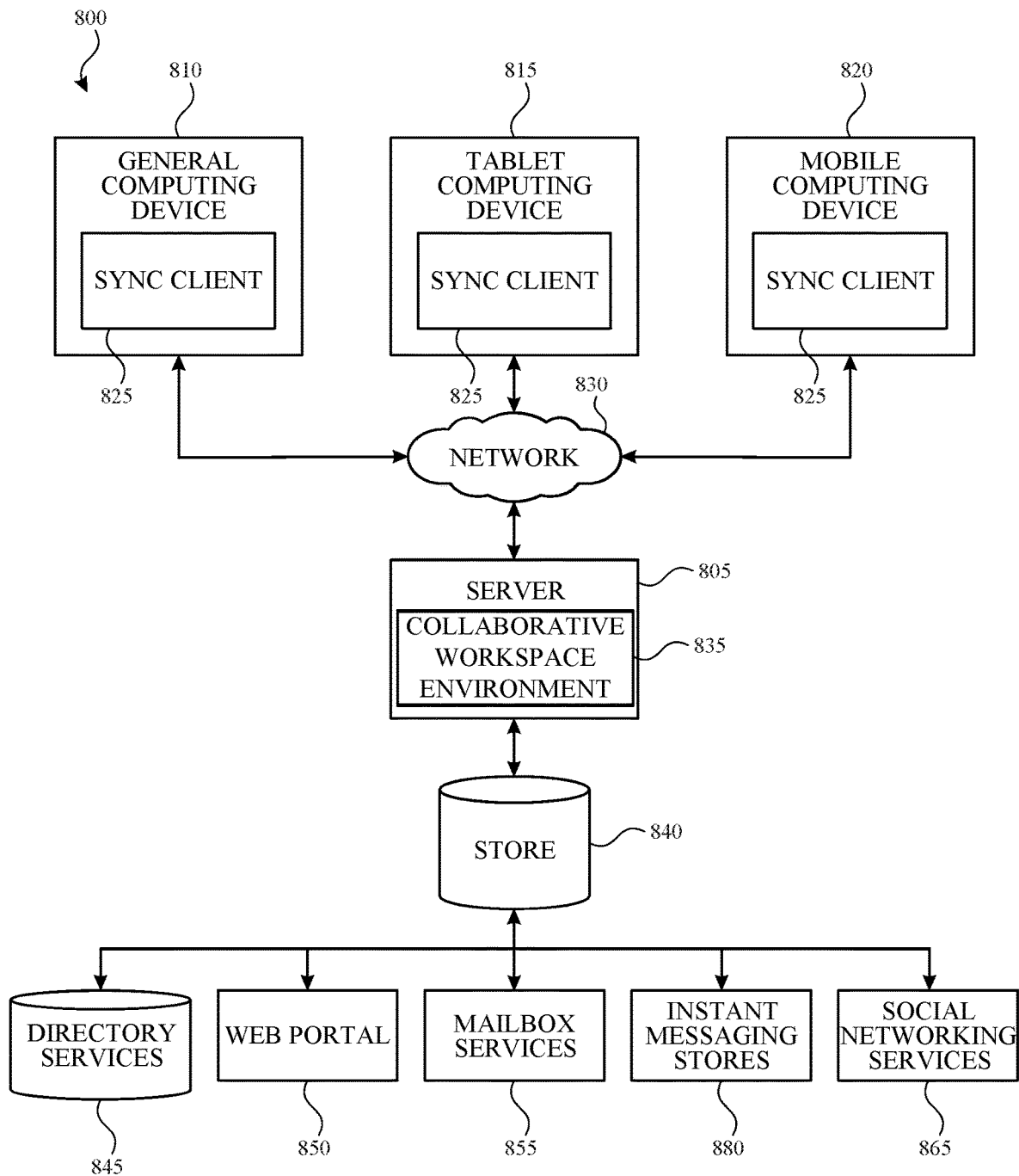
FIG. 8 is a simplified block diagram of a distributed computing system in which aspects of the present disclosure may be practiced.

FIG. 8 illustrates one aspect of the architecture of a system 800 for automatically synchronizing non-file content items such as described above. The system 800 may include a general computing device 810 (e.g., personal computer), tablet computing device 815, or mobile computing device 820, as described above. Each of these devices may include a synchronization client 825 such as described herein.

In some aspects, each of the general computing device 810 (e.g., personal computer), tablet computing device 815, or mobile computing device 820 may receive various other types of information or content that is stored by or transmitted from a directory service 845, a web portal 850, mailbox services 855, instant messaging stores 860, or social networking services 865.

In aspects, and as described above, each computing device may have access to a collaborative workspace environment 835 that is provided on a server 805, the cloud or some other remote computing device.

By way of example, the aspects described above may be embodied in a general computing device 810, a tablet computing device 815 and/or a mobile computing device 820. Any of these examples of the electronic devices may obtain content from or provide data to the store 840.

As should be appreciated, FIG. 8 is described for purposes of illustrating the present methods and systems and is not intended to limit the disclosure to a particular sequence of steps or a particular combination of hardware or software components.

Figure 9:
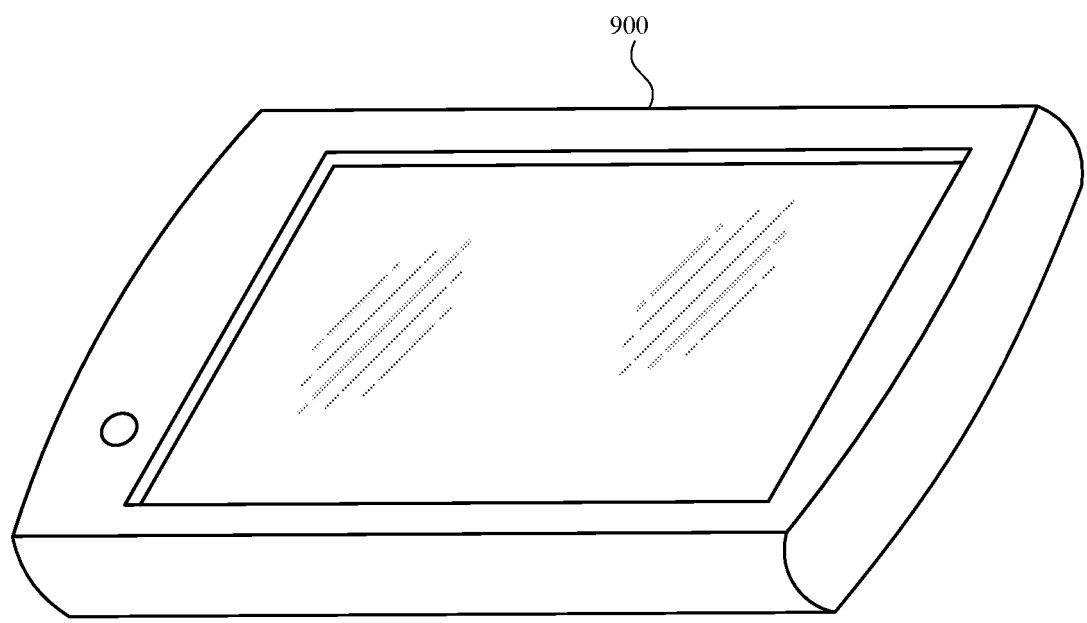
FIG. 9 illustrates a tablet computing device for executing one or more aspects of the present disclosure.

FIG. 9 illustrates an example tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more electronic devices. For example, user interfaces and information of various types may be displayed and interacted with on a wall surface onto which user interfaces and information of various types are projected. Interaction with the multitude of computing systems with which examples of the invention may be practiced include, keystroke entry, touch screen entry, voice or other audio entry, gesture entry where an associated computing device is equipped with detection (e.g., camera) functionality for capturing and interpreting gestures for controlling the functionality of the electronic device, and the like.

As should be appreciated, the figures herein FIG. 9 is described for purposes of illustrating the present methods and systems and is not intended to limit the disclosure to a particular sequence of steps or a particular combination of hardware or software components.

Described herein is a method, comprising: receiving a request for a non-file content item in a collection of non-file content items, wherein the non-file content item includes a plurality of individual content items arranged in various rows and columns; identifying the non-file content item from the collection of non-file content items using an identifier contained in the request; generating a non-file content package by converting the content in the non-file content item from a first format to a second format; and providing the non-file content package to a computing device that issued the request. In some examples, the collection of non-file content items is stored on a collaborative workspace environment. In some examples, the second format is a format required by a spreadsheet application executing on the computing device. In some examples, the method further includes restricting editing capabilities of one or more fields contained in the non-file content package. In some examples, the non-file content package only includes content that has changed between the request for the non-file content and a previously received request for the non-file content item. In some examples the method further includes receiving an updated non-file content item in the second format from the computing device. In some examples, the method further includes deconstructing the non-file content item into individual content items. In some examples, the method further includes updating the non-file content item in the collection of non-file content items using the individual content item.

Also described is a method, comprising: detecting that a list stored on a remote computing device has been updated; generating a request for the list; receiving the list in a format that is different from the original format of the list; storing the list in a directory that is protected by one or more permissions that specify operations that may not be performed on the directory and operations that may not be performed on the list; receiving a change to content contained in the list; and transmitting the list with the changed content to the remote computing device. In some examples, the method includes receiving a confirmation that the changed content in the list has been stored on the remote computing device. In some examples, the permissions that specify operations that may not be performed on the directory include one or more of a directory rename operation, a directory delete operation, and a directory move operation. In some examples, the permissions that specify operations that may not be performed on the list include one or more of a schema change operation and adding additional content to the list that does not coincide with content already contained in the list. In some examples, the format is a spreadsheet format. In some examples, receiving the list comprises only receiving content in the list that has been updated. In some examples, the method may also include generating the directory in response to determining that the list on the computing device has been updated. In some examples, generating the request comprises generating a request for only the content within the list that has been updated.

Also described is a system, comprising: at least one processor; and a memory coupled to the at least one processor and storing instructions that, when executed by the at least one processor, perform a method, comprising: storing non-file content items in a collection of non-file content items in the memory; receiving an update to at least one non-file content item that is included in the collection of non-file content items, wherein the update to the non-file content item is in a first format and wherein the non-file content items in the collection of non-file content items are stored in a second format that is different than the first format; identifying content in the at least one non-file content item that is different than content in the corresponding non-file content item in the collection of non-file content items; altering the first format of the content in the updated non-file content item so it conforms to the second format; and updating the corresponding non-file content item in the collection of non-file content items using the content. In some examples, the system also stores instructions for transmitting a notification to a computing device that provided the update to the non-file content item. In some examples, the system also stores instructions for determining whether a second update to the non-file content item has been received from another computing device. In some examples, the system also stores instructions for automatically resolving an update conflict between the update to the non-file content item and the second update to the non-file content item, based at least in part, on a time at which the update to the non-file content item and the second update to the non-file content item were received.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Additionally, each operation in the described methods may be performed in different orders and/or concurrently, simultaneously or substantially simultaneously with other operations.

Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
receiving, from a remote computing device, a request for a particular non-file content item in a collection of non-file content items associated with a collaborative workspace environment, wherein the particular non-file content item includes a plurality of individual content items arranged in various rows and columns;
identifying the particular non-file content item from the collection of non-file content items associated with the collaborative workspace environment using an identifier contained in the request;

generating a non-file content package by converting the content in the non-file content item from a first format associated with the collaborative workspace environment to a second format, the second format being associated with an application executing on the remote computing device; and providing the non-file content package to the application executing on the remote computing device.

2. The method of claim 1, wherein the collection of non-file content items is stored on the collaborative workspace environment.

3. The method of claim 2, wherein the second format is a format required by a spreadsheet application executing on the computing device.

4. The method of claim 1, further comprising restricting editing capabilities of one or more fields contained in the non-file content package.

5. The method of claim 1, wherein the non-file content package only includes content that has changed between the request for the non-file content and a previously received request for the non-file content item.

6. The method of claim 1, further comprising, receiving an updated non-file content item in the second format from the computing device.

7. The method of claim 6, further comprising deconstructing the non-file content item into individual content items.

8. The method of claim 7, further comprising updating the non-file content item in the collection of non-file content items using the individual content item.

9. A method, comprising:
detecting that a list stored on a remote computing device has been updated;
generating a request for the list;
receiving the list in a first format that is different from the original format of the list, the first format being associated with a particular application and the original format being associated with a collaborative workspace environment;
storing the list in a directory that is protected by one or more permissions that specify operations that may not be performed on the directory and operations that may not be performed on the list;
receiving a change to content contained in the list; and
transmitting the list with the changed content to the remote computing device.

10. The method of claim 9, further comprising receiving a confirmation that the changed content in the list has been stored on the remote computing device.

11. The method of claim 9, wherein the permissions that specify operations that may not be performed on the directory include one or more of a directory rename operation, a directory delete operation, and a directory move operation.

12. The method of claim 9, wherein the permissions that specify operations that may not be performed on the list include one or more of a schema change operation and adding additional content to the list that does not coincide with content already contained in the list.

13. The method of claim 9, wherein the first format is a spreadsheet format.

14. The method of claim 9, wherein receiving the list comprises only receiving content in the list that has been updated.

15. The method of claim 9, further comprising generating the directory in response to determining that the list on the computing device has been updated.

16. The method of claim 9, wherein generating the request comprises generating a request for only the content within the list that has been updated.

17. A system, comprising:
at least one processor; and
a memory coupled to the at least one processor and storing instructions that, when executed by the at least one processor, perform a method, comprising:
storing non-file content items in a collection of non-file content items in the memory;
receiving an update to at least one non-file content item that is included in the collection of non-file content items, wherein the update to the non-file content item is in a first format and wherein the non-file content items in the collection of non-file content items are stored in a second format that is different than the first format, the second format being associated with a collaborative workspace environment;
identifying content in the at least one non-file content item that is different than content in the corresponding non-file content item in the collection of non-file content items;
altering the first format of the content in the updated non-file content item so it conforms to the second format; and
updating the corresponding non-file content item in the collection of non-file content items using the content.

18. The system of claim 17, further comprising instructions for transmitting a notification to a computing device that provided the update to the non-file content item.

19. The system of claim 17, further comprising instructions for determining whether a second update to the non-file content item has been received from another computing device.

20. The system of claim 19, further comprising instructions for automatically resolving an update conflict between the update to the non-file content item and the second update to the non-file content item, based at least in part, on a time at which the update to the non-file content item and the second update to the non-file content item were received.

* * * * *